(12) United States Patent
Yang

(10) Patent No.: US 10,795,574 B2
(45) Date of Patent: *Oct. 6, 2020

(54) INPUT METHOD, INPUT APPARATUS, AND TERMINAL DEVICE

(71) Applicant: HUAWEI DEVICE CO., LTD., Dongguan, Guangdong (CN)

(72) Inventor: Yun Yang, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,438

(22) Filed: May 13, 2019

(65) Prior Publication Data
US 2019/0265887 A1 Aug. 29, 2019

Related U.S. Application Data

(63) Continuation of application No. 14/087,790, filed on Nov. 22, 2013, now Pat. No. 10,331,339, which is a (Continued)

(51) Int. Cl.
G06F 3/0488 (2013.01)
G06F 3/02 (2006.01)

(52) U.S. Cl.
CPC ........ G06F 3/04886 (2013.01); G06F 3/0216 (2013.01)

(58) Field of Classification Search
CPC ......... G06F 3/0233–0237; G06F 3/048; G06F 3/0216
See application file for complete search history.

(56) References Cited

U.S. PATENT DOCUMENTS

2005/0136984 A1 6/2005 Nakatsuchi et al.
2005/0210402 A1* 9/2005 Gunn .................. G06F 3/0236
715/773
(Continued)

FOREIGN PATENT DOCUMENTS

CN 101477431 A 7/2009
CN 102203715 A 9/2011
(Continued)

OTHER PUBLICATIONS

Japanese Notice of Allowance dated Aug. 18, 2015 in corresponding Japanese Patent Application No. 2014-511699.
(Continued)

Primary Examiner — Liang Y Li
(74) Attorney, Agent, or Firm — Conley Rose, P.C.

(57) ABSTRACT

An input method is provided by embodiments of the present invention, relating to the communications field, and invented to improve the input experience of a user. The input method includes: providing an input interface on a touch display screen, where the input interface includes a virtual soft keyboard distributed in a sector area around a lower left corner or lower right corner of the input interface; receiving an input instruction which is input by a user through the virtual soft keyboard; and displaying input information corresponding to the input instruction. An input apparatus and a terminal device are also provided by embodiments of the present invention. The present invention is applicable to a mobile device or a handheld device.

17 Claims, 14 Drawing Sheets

Related U.S. Application Data continuation of application No. PCT/CN2011/074533, filed on May 23, 2011.

(56) References Cited

U.S. PATENT DOCUMENTS

| | | |
|---|---|---|
| 2005/0253816 A1 | 11/2005 | Himberg et al. |
| 2006/0085757 A1* | 4/2006 | Andre ............... G06F 3/04883 715/771 |
| 2007/0046641 A1 | 3/2007 | Lim |
| 2007/0061753 A1 | 3/2007 | Ng |
| 2008/0007484 A1 | 1/2008 | Iwakura |
| 2009/0160792 A1* | 6/2009 | Morohoshi ......... G06F 3/0488 345/173 |
| 2009/0167706 A1* | 7/2009 | Tan ................... G06F 3/04883 345/173 |
| 2010/0013780 A1* | 1/2010 | Ikeda ................ G06F 3/04883 345/173 |
| 2010/0131900 A1* | 5/2010 | Spetalnick ......... G06F 40/274 715/825 |
| 2010/0185971 A1 | 7/2010 | Ito |
| 2010/0225599 A1 | 9/2010 | Danielsson |
| 2010/0241985 A1* | 9/2010 | Kim ................... G06F 3/04886 715/773 |
| 2010/0293457 A1* | 11/2010 | Peterson .............. G06F 3/0236 715/261 |
| 2011/0197128 A1 | 8/2011 | Assadollahi |
| 2011/0242138 A1 | 10/2011 | Tribble |
| 2012/0062465 A1* | 3/2012 | Spetalnick ......... G06F 3/04886 345/168 |
| 2012/0162078 A1* | 6/2012 | Ferren ................ G06F 3/04886 345/168 |
| 2012/0293529 A1* | 11/2012 | Che ..................... G06F 3/0236 345/589 |
| 2013/0046544 A1 | 2/2013 | Kay |
| 2013/0241838 A1 | 9/2013 | Onishi |

FOREIGN PATENT DOCUMENTS

| | | |
|---|---|---|
| EP | 1 887 451 A2 | 2/2008 |
| EP | 2 169 521 A1 | 3/2010 |
| JP | 2005-530235 | 10/2005 |
| JP | 2008-020955 | 1/2008 |
| JP | 2009-509235 | 3/2009 |
| JP | 2011-59998 | 3/2011 |
| JP | 2012-521034 | 9/2012 |
| JP | 2012-527709 | 11/2012 |
| JP | 2003-131811 | 5/2015 |
| KR | 10-0852401 | 8/2008 |
| WO | WO 01/43403 A1 | 6/2001 |
| WO | 2007/032843 A2 | 3/2007 |
| WO | WO 2007/037808 A1 | 4/2007 |
| WO | WO 2008/152679 A1 | 12/2008 |
| WO | 2010/147611 A1 | 12/2010 |
| WO | WO 2010/147611 A1 | 12/2010 |

OTHER PUBLICATIONS

Japanese Office Action dated Dec. 2, 2014 in corresponding Japanese Patent Application No. 2014-511699.
International Search Report dated Mar. 8, 2012, in corresponding International Patent Application No. PCT/CN2011/074533.
Extended European Search Report dated Feb. 19, 2014, in corresponding European Patent Application No. 11777231.9.
U.S. Office Action dated Jan. 25, 2016 from U.S. Appl. No. 14/087,790.
U.S. Office Action dated Jul. 28, 2016 from U.S. Appl. No. 14/087,790.
U.S. Office Action dated Nov. 2, 2016 from U.S. Appl. No. 14/087,790.
U.S. Office Action dated May 18, 2017 from U.S. Appl. No. 14/087,790.
U.S. Advisory Action dated Aug. 28, 2017 from U.S. Appl. No. 14/087,790.
U.S. Office Action dated Feb. 28, 2018 from U.S. Appl. No. 14/087,790.
U.S. Office Action dated Sep. 17, 2018 from U.S. Appl. No. 14/087,790.
U.S. Notice of Allowance dated Feb. 5, 2018 from U.S. Appl. No. 14/087,790.
U.S. Appl. No. 14/087,790 (U.S. Pat. No. 10,331,339), filed Nov. 22, 2013 (Jun. 25, 2019), Yun Yang, Huawei Device Co., Ltd.

* cited by examiner

INPUT METHOD, INPUT APPARATUS, AND TERMINAL DEVICE

CROSS-REFERENCE TO RELATED APPLICATIONS

This application is a continuation of U.S. patent application Ser. No. 14/087,790, filed on Nov. 22, 2013, which is a continuation of International Application No. PCT/CN2011/074533 filed on May 23, 2011. All of the aforementioned patent applications are hereby incorporated by reference in their entireties.

FIELD OF THE INVENTION

The present invention relates to the field of communications technologies, and in particular, to an input method, an input apparatus, and a terminal device.

BACKGROUND OF THE INVENTION

With the emergence of social networking sites, more and more young people like to use handheld devices to access social networking services SNS (Social Networking Services) sites such as FACEBOOK and TWITTER to publish messages. Therefore, simple and fast inputs on handheld devices become increasingly important.

However, with the continuous improvement of hardware technologies, a majority of newly launched handheld devices adopt a full touch display screen design. The front panel in the body of a handheld device usually includes only a touch display screen and few keys. The interface is simplified significantly, but the input manner is quite different from conventional input manners because physical input keys are removed. As shown in FIG. 1, in the touch screen input method in the prior art, a virtual soft keyboard is used for inputting at the lower part of the screen of a handheld device and is displayed in an input area. A user uses the virtual soft keyboard for inputting in the input area. The input method displays associated terms in a term selection area. After the user selects a term for inputting in the term selection area, the selected content is displayed in a display area. This input manner simulates the conventional input manner of a physical keyboard to some extent. Even if a physical keyboard is used, all handheld device products available in the market have a physical keyboard disposed in the lower part thereof, normally in a rectangular shape.

When the handheld device in the prior art is used, it is found that the prior art has at least the following problems:

When using the input method in the prior art for inputting, the user normally holds the handheld device with a single hand and performs an input with the thumb of the hand. When the user selects content in some areas untouchable to the thumb, the user needs to hold the handheld device with the other hand. This weakens the input experience of the user. In particular, when the user uses a wide-screen handheld device, the user can difficulty perform an input with a single hand. Moreover, the input manner in the prior art decreases the input speed to some extent, increases the fatigue of fingers, and reduces the user experience.

SUMMARY OF THE INVENTION

Embodiments of the present invention provide an input method, an input apparatus, and a terminal device, which can solve the problems of a low input speed and poor user experience of the input manner in the prior art.

To achieve the foregoing objectives, embodiments of the present invention adopt the following technical solutions:

An input method includes the following steps:

providing an input interface on a touch display screen, where the input interface includes a virtual soft keyboard distributed in a sector area around a lower left corner or lower right corner of the input interface;

receiving an input instruction which is input by a user through the virtual soft keyboard; and displaying input information corresponding to the input instruction.

An input apparatus includes:

an inputting unit, configured to provide an input interface on a touch display screen, where the input interface includes a virtual soft keyboard distributed in a sector area around a lower left corner or lower right corner of the input interface;

a receiving unit, configured to receive an input instruction which is input by a user through the inputting unit; and a displaying unit, configured to display input information corresponding to the input instruction received by the receiving unit.

A terminal device includes an input apparatus, which is the input apparatus provided by the embodiments of the present invention.

With the foregoing technical solutions, the virtual soft keyboard is distributed in the sector area around the lower left corner or lower right corner of the input interface, which may centralize input operations in an area covered by turning a thumb by the user, facilitate the tapping of the user, and allow the user to easily perform input operations while holding the device. Therefore, the input method, input apparatus, and terminal device provided by the embodiments of the present invention increase the input speed of the user, effectively reduce the fatigue of the finger, and apparently improve the input experience of the user.

BRIEF DESCRIPTION OF THE DRAWINGS

To describe the technical solutions in the embodiments of the present invention or in the prior art more clearly, the following briefly introduces the accompanying drawings needed for describing the embodiments or the prior art. Apparently, the accompanying drawings in the following descriptions show merely some embodiments of the present invention, and persons of ordinary skill in the art may still derive other drawings from the accompanying drawings without creative efforts.

DETAILED DESCRIPTION OF THE EMBODIMENTS

The following clearly describes the technical solutions in the embodiments of the present invention with reference to the accompanying drawings in the embodiments of the present invention.

It is obvious that the described embodiments are a part rather than all of the embodiments of the present invention. All other embodiments obtained by persons of ordinary skill in the art based on the embodiment of the present invention without creative efforts shall fall within the protection scope of the present invention.

Figure 1:
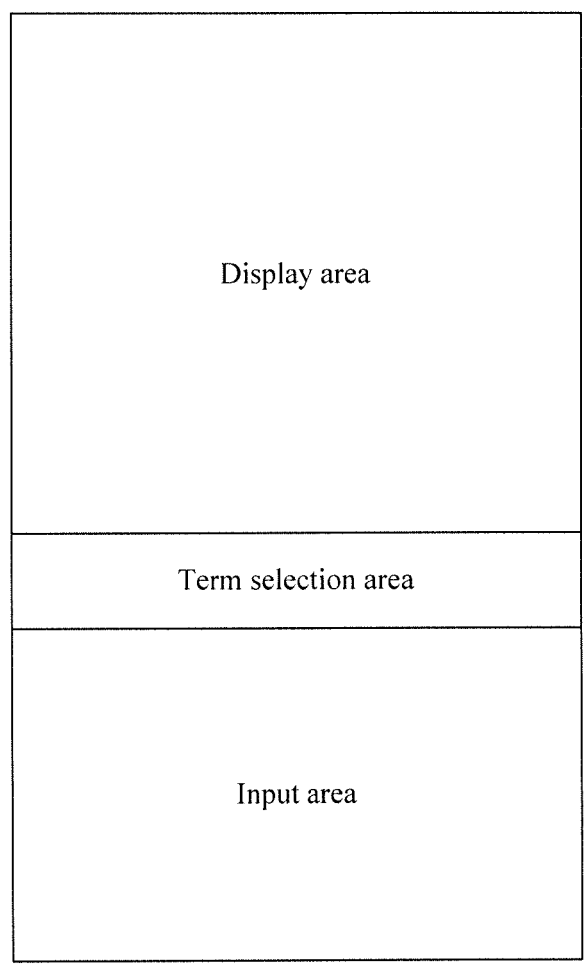
FIG. 1 is a schematic diagram of an input interface in the prior art.
Figure 2:
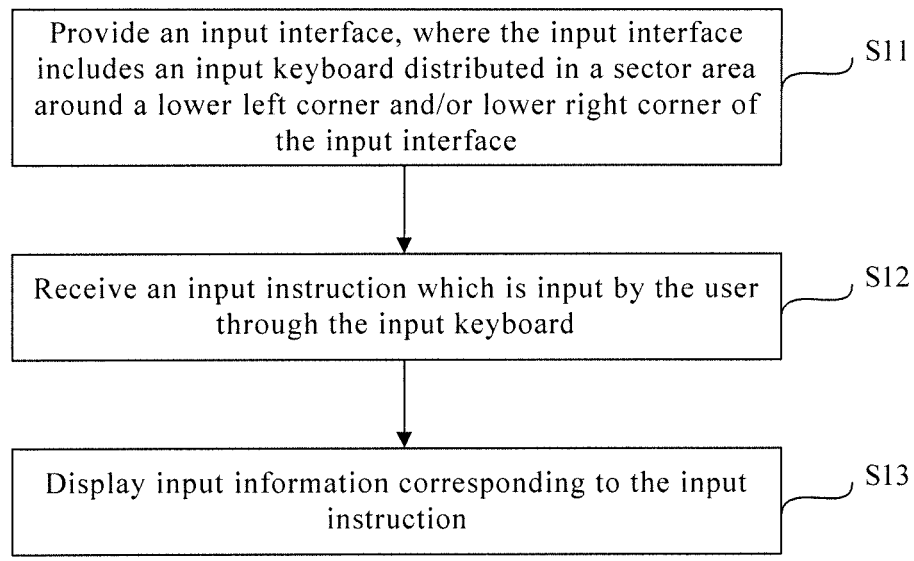
FIG. 2 is a flowchart of an input method according to an embodiment of the present invention.

An embodiment of the present invention provides an input method. As shown in FIG. 2, the method includes the following steps:

S11. Provide an input interface, where the input interface includes an input keyboard distributed in a sector area around a lower left corner and/or lower right corner of the input interface.

The input interface may include a display area for displaying final input information of a user. In the embodiment of the present invention, for a device with a full touch display screen, the input interface refers to an input interface which is presented on the touch display screen in a full-screen or non-full-screen manner when the user performs an input and used for interaction with the user; and for a device with a physical keyboard, the input interface refers to an input interface of the physical keyboard and the display screen disposed on the device when the user performs an input.

It should be noted that in the embodiment of the present invention, the input keyboard distributed in the sector area may be a virtual soft keyboard used for a touch display screen, and may also be a physical keyboard, and may also be a mixture of a virtual soft keyboard and a physical hard keyboard, which is not limited by the present invention.

S12. Receive an input instruction which is input by the user through the input keyboard.

In step S12, the user may issue an input instruction by touching or tapping any key on the input keyboard.

S13. Display input information corresponding to the input instruction.

Figure 3:
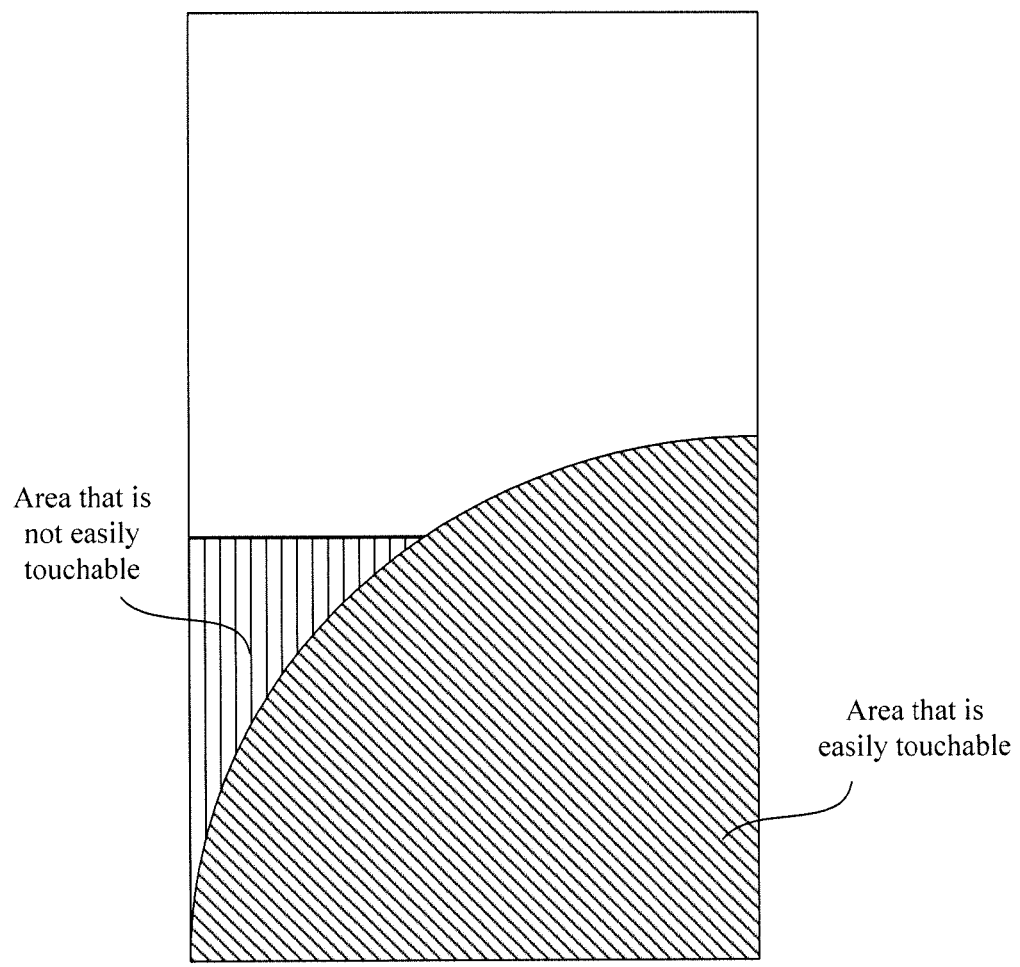
FIG. 3 is a schematic diagram of a difficultly and easily touchable area on an input interface.

Taking a mobile phone as an example, according to the habit of using mobile phones by a majority of users, when a user performs an input, the user normally holds the mobile phone with a right/left hand, with the root of the thumb of the right/left hand fixed at the lower right/left corner of the body of the mobile phone, and performs an input by tapping on the keyboard with the thumb of the right/left hand. Of course, in case of a big mobile phone or out of habit, the user may hold the mobile phone with both hands. The roots of the thumbs of the left hand and right hand are fixed at the lower left and right corners of the mobile phone, and the user performs an input with the thumb of the right hand or the thumb of the left hand or both hands. No matter which manner is used, when the user performs an input, the area covered by turning a thumb by the user on the input interface is an area easily touchable to the user. Taking the input by the right hand as an example, as shown in FIG. 3, on the input interface, the area covered by turning the thumb of the right hand by the user is the area easily touchable to the user, that is, the user can touch the area by only moving or turning the thumb while keeping the root of the thumb fixed. For an area that is not easily touchable, if the user wants to touch the area, the user needs to change the holding gesture of the right hand or use the left hand.

In the use of the mobile phone, when the user holds the mobile phone with the right hand, an input keyboard is disposed in an area covered by turning the thumb of the right hand by the user, that is, the input keyboard is distributed in a sector area around the lower right corner of the input interface; when the user holds the mobile phone with both hands, an input keyboard may be disposed in an area covered by turning the thumb of the right hand by the user and an area covered by turning the thumb of the left hand by the user, that is, the input keyboard is distributed in a sector area around the lower right corner of the input interface and a sector area around the lower left corner of the input interface, where the sector area around the lower left corner of the input interface may not overlap or may partly overlap with the sector area around the lower right corner of the input interface.

Based on the above analysis, in the embodiment of the present invention, in step S11, the provided input keyboard is distributed in the sector area around the lower left corner and/or lower right corner of the input interface, and preferably, and the size and location of the input keyboard are adaptable to the position and activity scope of a finger used by the user when the user performs an input operation. To be specific, keys of the input keyboard may be centralized in the area covered by turning an input finger by the user, that is, all input keys are located in an effective area touchable to the input finger of the user, and can be easily touched and tapped by the user. Therefore, the input operations of the user in a difficultly touchable area are avoided, and the user can perform an input with a single hand, without changing a hand gesture or using the other hand. Therefore, the input method provided by the embodiment of the present invention can increase the input speed of the user, effective reduce the fatigue of the finger, and thus apparently improve the input experience of the user.

In the following detailed description, it is assumed that the input keyboard is a virtual soft keyboard. In this case, step S11 specifically includes: providing an input interface on a touch display screen, where the input interface includes a virtual soft keyboard distributed in a sector area around a lower left corner and/or lower right corner of the input interface. Step S12 specifically includes: receiving an input instruction input by a user through the virtual soft keyboard.

Figure 4:
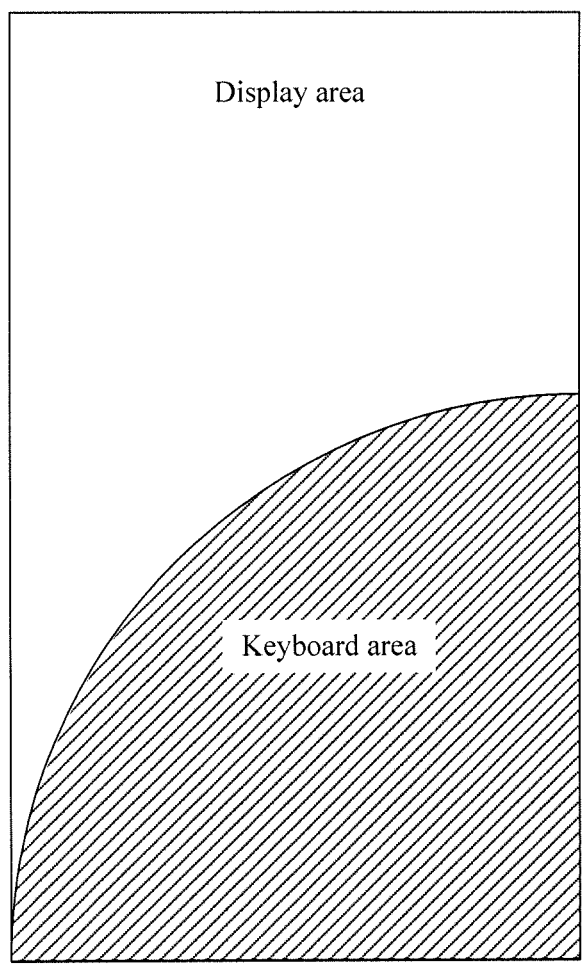
FIG. 4 is a schematic diagram of an input interface provided in an input method according to an embodiment of the present invention.
Figure 5:
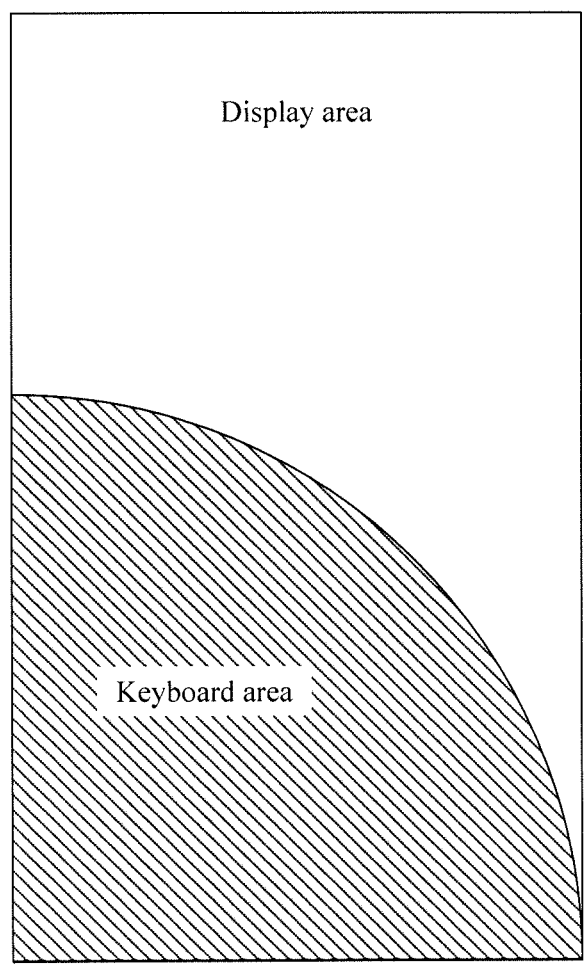
FIG. 5 is a schematic diagram of another input interface provided in an input method according to an embodiment of the present invention.
Figure 6:
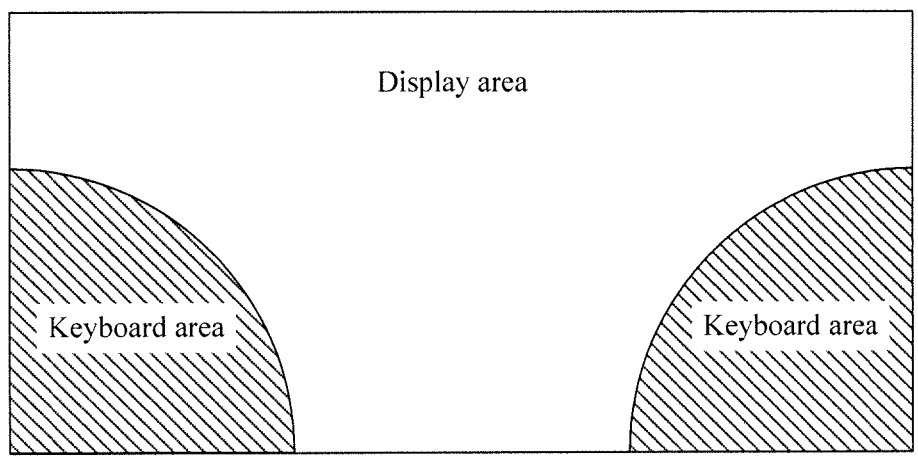
FIG. 6 is a schematic diagram of another input interface provided in an input method according to an embodiment of the present invention.

Alternatively, several input interfaces provided in step S11 are shown in FIG. 4 to FIG. 6, where the shadow part in the sector represents a sector area corresponding to a virtual soft keyboard, and the upper area on the input interface is a display area. On the input interface shown in FIG. 4, a virtual soft keyboard is distributed in a sector area around the lower right corner of the input interface, and is applicable to a user who performs an input with a right hand. On the input interface shown in FIG. 5, a virtual soft keyboard is distributed in a sector area around the lower left corner of the input interface, and is applicable to a user who performs an input with a left hand. On the input interface shown in FIG. 6, a virtual soft keyboard is distributed in sector areas around the lower right corner and lower left corner of the input interface simultaneously, and is applicable to a user who performs an input with both hands. In step S11, an input interface of any manner as shown in FIG. 4 to FIG. 6 may be provided.

Figure 7:
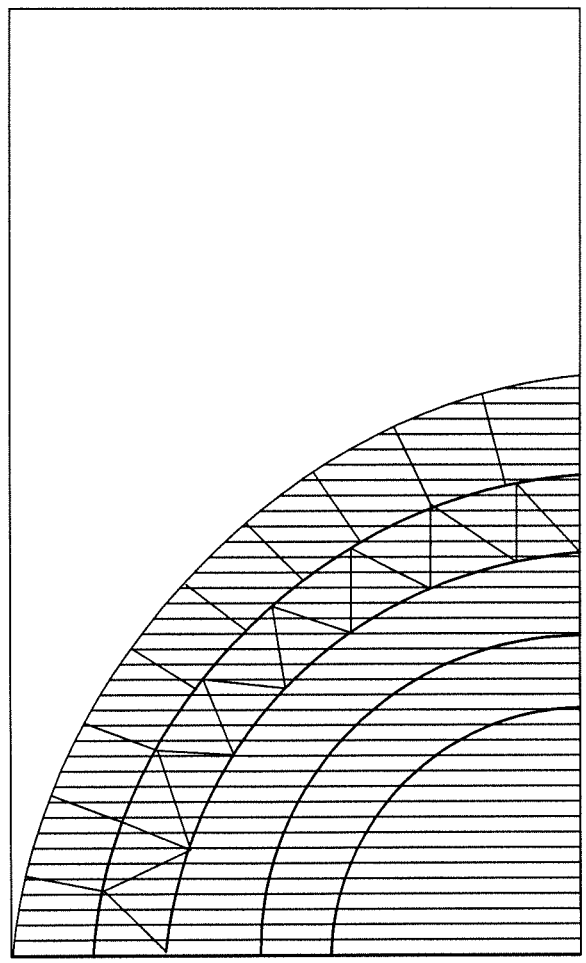
FIG. 7 is a schematic diagram of a virtual soft keyboard provided in an input method according to an embodiment of the present invention.
Figure 8:
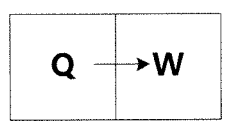
FIG. 8 is a schematic diagram of keys in a virtual soft keyboard provided in an input method according to an embodiment of the present invention.
Figure 9:
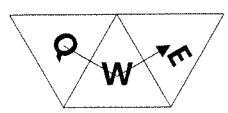
FIG. 9 is another schematic diagram of keys in a virtual soft keyboard provided in an input method according to an embodiment of the present invention.

Alternatively, in an embodiment of the present invention, on the input interface provided in step S11, the distribution of the sector area of a virtual soft keyboard may be as shown in FIG. 7, where the virtual soft keyboard includes key bars in sector ring shapes distributed in sequence from outside to inside in the sector area, and the key bars are provided with keys. Specifically, the shapes of the keys on the key bars in sector ring shapes may be the same or different, and the shapes are not limited. The shape of a key may be a rectangular shape as shown in FIG. 8, or a triangular shape as shown in FIG. 9, or any other shapes such as an irregular polygonal shape, for example, a star shape. The arrow shown in FIG. 8 and FIG. 9 indicates a movement track of a finger that moves from one key to another key when the user performs an input. As shown in FIG. 8, when the keys on a key bar are in a rectangular shape, the finger moves horizontally when the user performs an input. The keys in FIG. 9 are in a triangular shape, and this, in comparison with the keys in a rectangular shape, increases the number of keys in the same area, and shortens the distance in the movement of the finger when the user performs an input. In addition, in the switching of keys, the finger no longer moves horizontally. Instead, actions of finger bending and stretching are added. After a short-time exercise, the user more easily remembers and uses this movement manner. Therefore, preferably, the keys on the key bars take on triangular shapes.

Figure 10:
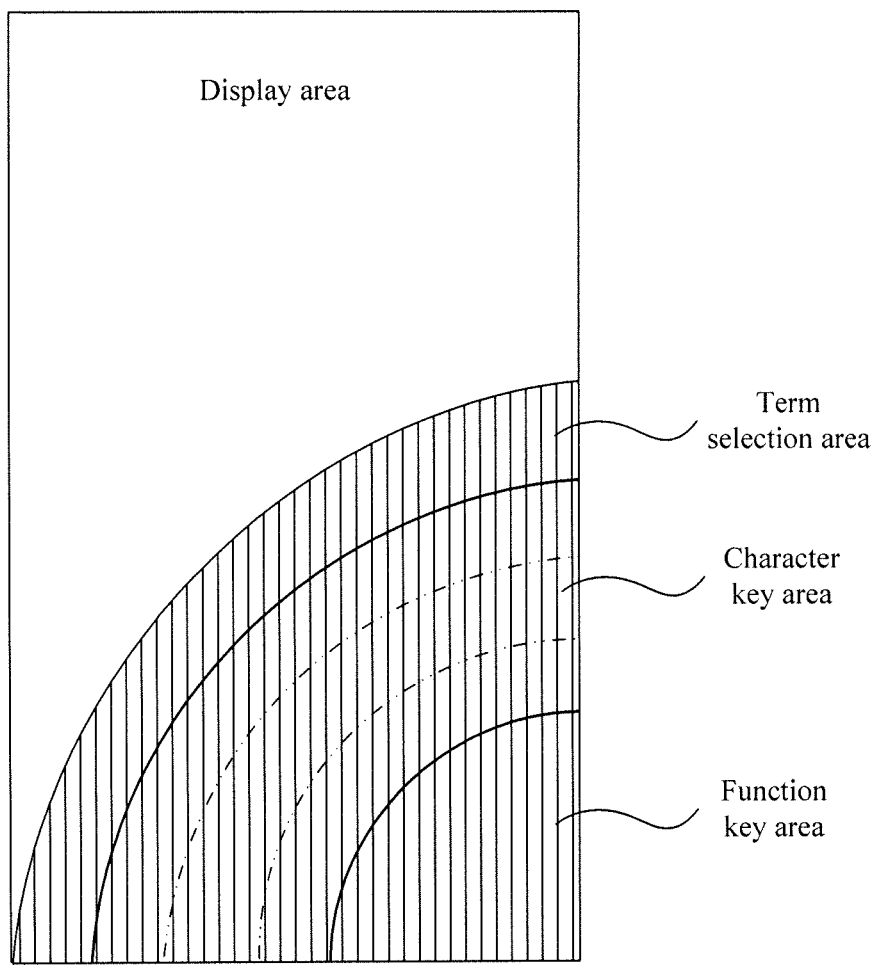
FIG. 10 is another schematic diagram of a virtual soft keyboard provided in an input method according to an embodiment of the present invention.

When the user performs an input with the thumb of a single hand, the root of the thumb is close to the lower right/left corner of the input interface. Apparently, according to the bending degree of the thumb, in the sector area corresponding to the virtual soft keyboard, the area closest to the root of the thumb is an area that is not easily touchable to the user, the area in the middle of the sector area is an area that is the most easily touchable to the user, and the outermost area in the sector area is an area that is more easily touchable to the user. Therefore, according to the degree of difficulty and easiness of being touched by the user, further, in an embodiment of the present invention, as shown in FIG. 10, on the input interface provided in step S11, the virtual soft keyboard may include a term selection area, a character key area, and a function key area. Alternatively, the term selection area includes one or more key bars in sector ring shapes outermost in the sector area; the character key area includes one or more key bars in sector ring shapes in the middle of the sector area and is adjacent to the term selection area; and the function key area includes one or more key bars in sector ring shapes innermost in the sector area and is adjacent to the character key area.

The term selection area is used to place candidate terms provided for the user. Alternatively, the term selection area appears in the virtual soft keyboard only when it is necessary to place the candidate terms provided for the user, and when no candidate term is available, the term selection area in the virtual soft keyboard may be blank or may be displayed as a blank sector ring.

The character key area is used to place various characters corresponding to instructions input by the user, and is the mostly frequently touched area when the user performs an input. The function key area is used to place less frequently used function keys, such as a menu key and a Chinese/English switch key.

Alternatively, in an embodiment of the present invention, on the input interface provided in step S11, the virtual soft keyboard may include only a term selection area and a character key area. The term selection area is distributed in an outmost sector ring in the sector area and includes one or more key bars in sector ring shapes; and the character key area is distributed in an innermost sector section or sector ring in the sector area, includes one or more key bars in sector ring shapes, and is adjacent to the term selection area.

Figure 11:
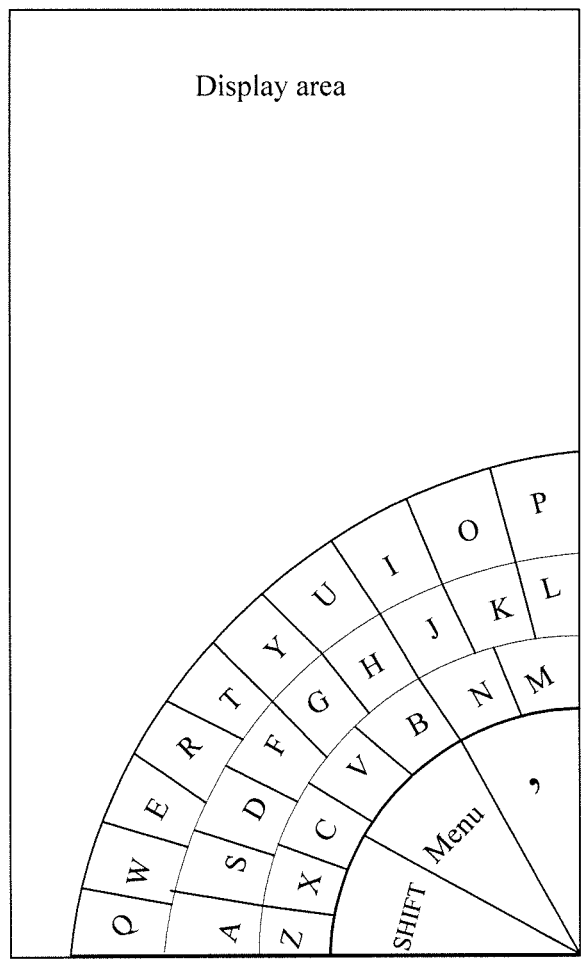
FIG. 11 is a specific exemplary diagram of the virtual soft keyboard shown in FIG. 10.

FIG. 11 is a specific exemplary diagram of the virtual soft keyboard shown in FIG. 10. As shown in FIG. 11, the term selection area is blank; in the character key area, according to the distribution rule of a complete conventional keyboard, a key bar in a sector ring shape which is formed by the keys Q-P of the conventional keyboard is located in the outer layer of the character key area, a key bar in a sector ring shape which is formed by the keys A-L is located in the middle layer of the character key area, and a key bar in a sector ring shape which is formed by the keys Z-M is located in the inner layer of the character key area; and function keys such as the Shift, Back, and punctuation switch key are placed in the function key area.

Alternatively, step S13 may include: in the display area of the input interface, displaying input information corresponding to an instruction input by the user; or in the term selection area of the virtual soft keyboard, displaying input information corresponding to an instruction input by the user. For example, when a Chinese pinyin input is performed, the term selection area displays multiple Chinese characters or terms corresponding to the Chinese pinyin for the user to make a selection.

Figure 12:
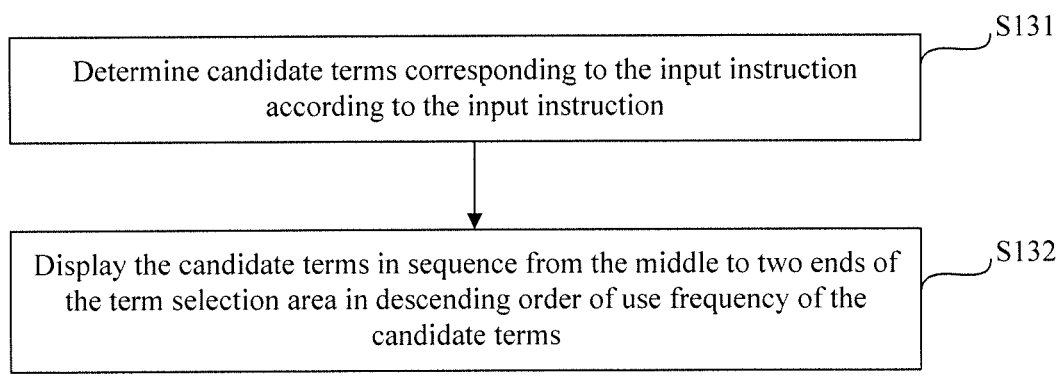
FIG. 12 is another flowchart of an input method according to an embodiment of the present invention.

Specifically, when the input information corresponding to the instruction input by the user is displayed in the term selection area of the virtual soft keyboard, two display manners may be used in step S13. In a first manner, as shown in FIG. 12, step S13 may specifically include the following:

S131. Determine candidate terms corresponding to the input instruction according to the input instruction.

S132. Display the candidate terms in sequence from the middle to two ends of the term selection area in descending order of use frequency of the candidate terms.

Figure 13:
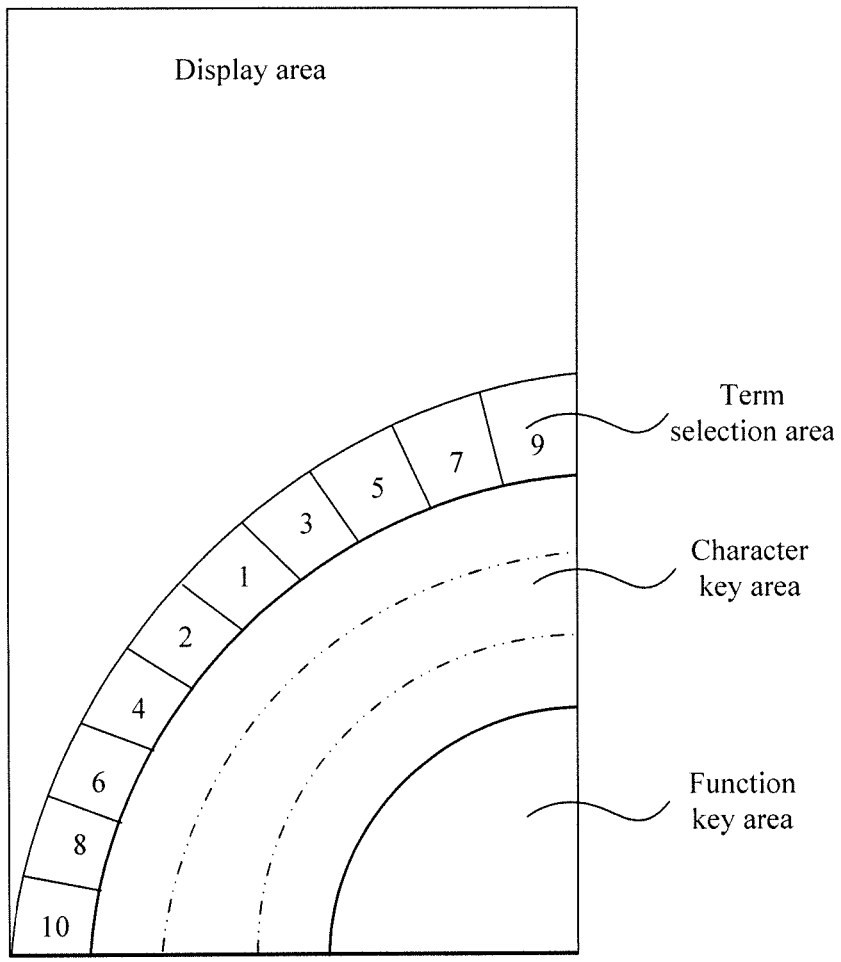
FIG. 13 is a schematic diagram of a term selection area corresponding to the flowchart shown in FIG. 12.

The distribution of the candidate terms in the term selection area is specifically shown in FIG. 13, where the numbers 1 to 10 represent the positions of the candidate terms in the term selection area in descending order of use frequency. According to the default bending degree of the thumb of the user, 1 and 2 in FIG. 13 represent the positions that are the most easily touchable. After the user finishes inputting an input instruction corresponding to a candidate term, the bending positions to which the thumb is restored in a relaxed state are normally the positions represented by 1 and 2. Therefore, the user basically does not need to move the finger again to select a term, thereby further increasing the input speed and enhancing the user experience.

Figure 14:
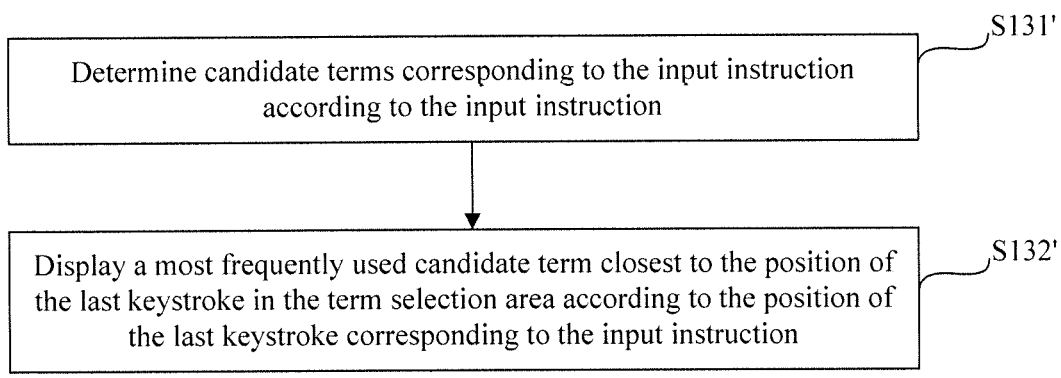
FIG. 14 is another flowchart of an input method according to an embodiment of the present invention.

Alternatively, in a second manner, as shown in FIG. 14, step S13 may specifically include the following:

S131'. Determine candidate terms corresponding to the input instruction according to the input instruction.

S132'. Display a most frequently used candidate term closest to the position of the last keystroke in the term selection area according to the position of the last keystroke corresponding to the input instruction.

For example, after the user finishes inputting a first term, for example, "chang c", when the user inputs a second character c, the most frequently used term "长城" is displayed as an option in a position closest to the key c currently pressed in the term selection area. If the user continues to input the letter i, the most frequently used candidate term is "场次", and at this time, the option "场次" is displayed in a position closest to the key i currently pressed in the term selection area.

The use frequency of candidate terms may be preset or may be dynamically measured in a use process of the user.

Specifically, the candidate terms displayed in the term selection area include at least one of candidate single characters or candidate associated terms corresponding to the input instruction; and the candidate single characters or candidate associated terms may be displayed simultaneously or displayed separately. Further, after the input information corresponding to the input instruction is displayed in the term selection area, the input method in this embodiment may further include:

receiving a term selection area display manner instruction issued by the user; and displaying, in the term selection area, only the candidate single characters or candidate associated terms corresponding to the input instruction according to the term selection area display manner instruction issued by the user.

Figure 15:
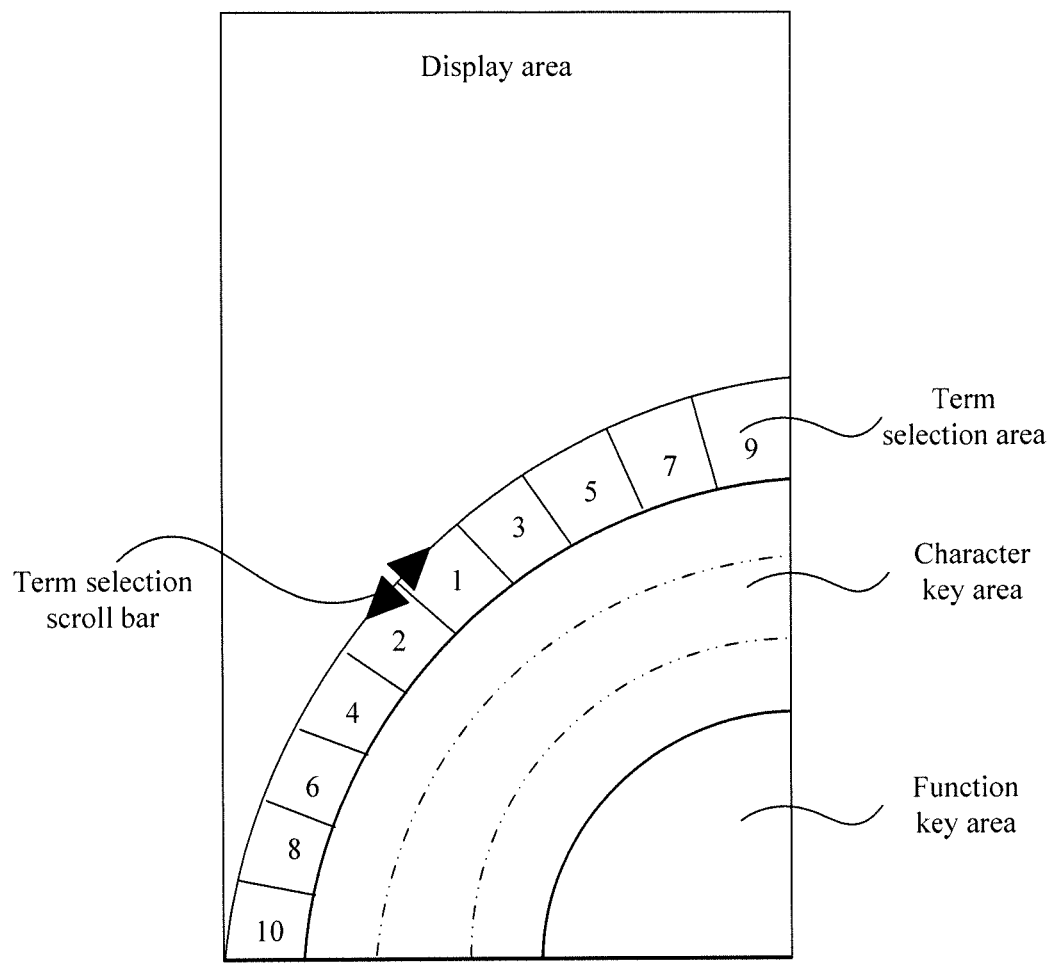
FIG. 15 is a schematic diagram of a term selection area in a virtual soft keyboard provided in an input method according to an embodiment of the present invention.

The term selection area display manner instruction may indicate that a finger of the user presses a specified position in the term selection area and slides in one direction. Alternatively, as shown in FIG. 15, when the user selects a target term through the term selection area, the user may press the scroll bar in the term selection area and slide counterclockwise so that the term selection area displays only candidate single characters; or press the scroll bar in the term selection area and slide clockwise so that the term selection area displays only candidate associated terms, or vice versa.

It should be noted that in the embodiment of the present invention, the candidate single characters or candidate associated terms corresponding to the input instruction have the following meaning: taking the pinyin input of Chinese characters as an example, after the user inputs pinyin, that is, after the user issues an input instruction, the candidate single characters corresponding to the input instruction are single Chinese characters corresponding to the pinyin; and the candidate terms corresponding to the input instruction are frequently used terms starting with the Chinese characters corresponding to the pinyin. For example, when the user inputs pinyin "mei", the candidate single characters may include single characters such as "没, 每, 美 . . . ", and the candidate terms may include associated terms such as "没有, 没想到, 每天, 美丽, 美好 . . . ."

The input method provided by the embodiment of the present invention optimizes the design of the location and distribution of the virtual soft keyboard; the keys of the virtual soft keyboard may be centralized in an area covered by turning a finger by the user, which facilitates the tapping of the user, and allows the user to easily perform an input while holding the device. The user can perform an input with a single hand, without changing the hand gesture or using the other hand. In addition, the virtual soft keyboard is centralized in an area that can be easily tapped by the user, which can increase the input speed of the user, effectively reduce the fatigue of the finger, and apparently enhance the input experience of the user.

Further, because the length of the input finger of different users varies, the area covered by turning the input finger by different users also varies. When a user uses the input method provided by the embodiment, to further enhance the user experience, the input method in this embodiment may further include:

receiving an initialization instruction issued by the user for the virtual soft keyboard, where the initialization instruction indicates that a thumb of the user slides on the input interface, with the root of the thumb fixed in a position close to the lower left corner or lower right corner of the input interface and with the root of the thumb as a center; and determining a distribution area of the virtual soft keyboard on the input interface according to the initialization instruction for the virtual soft keyboard, where the distribution area is a sector area with a track corresponding to the initialization instruction as a boundary and the root of the thumb close to the lower left corner or lower right corner of the input interface as a vertex.

Figure 16:
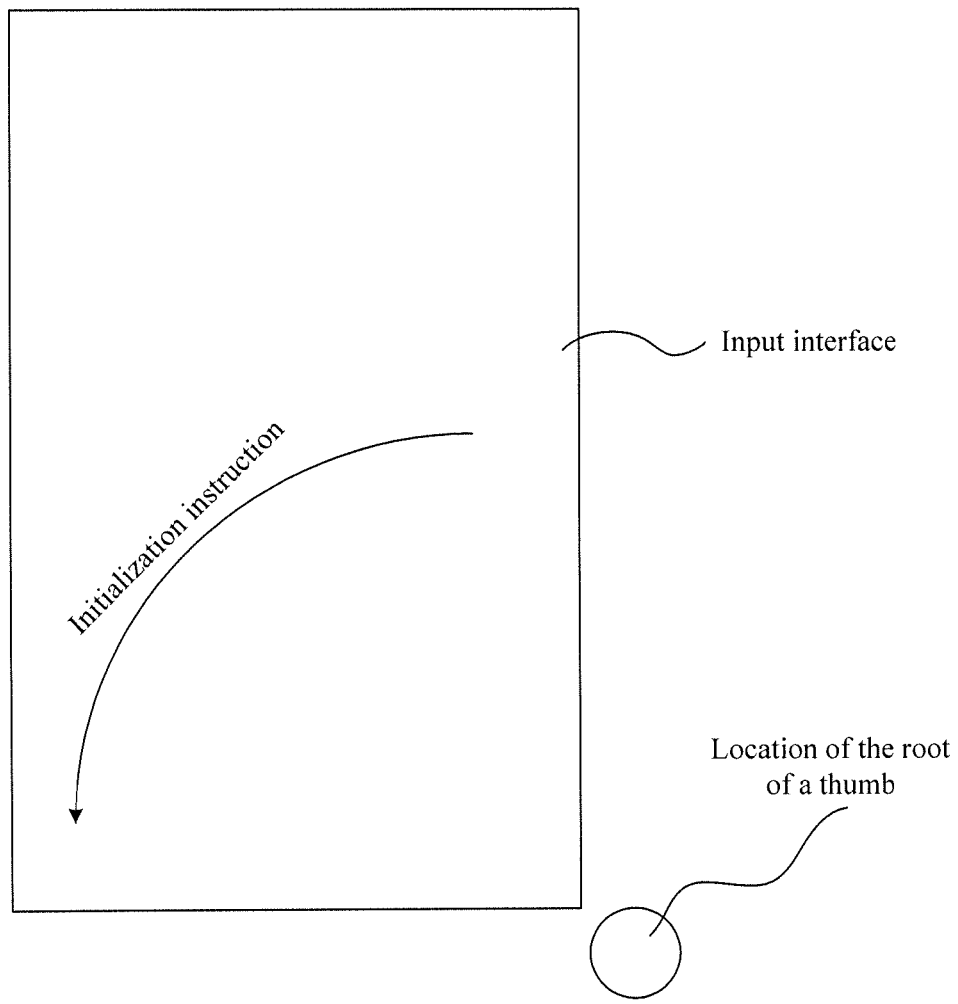
FIG. 16 is a schematic diagram of an initialization instruction in an input method according to an embodiment of the present invention.

For example, as shown in FIG. 16, when the user issues an initialization instruction, the root of the thumb of the right hand is fixed in a position close to the lower right corner of the input interface, and the thumb slides around the root of the thumb, and the area covered by sliding the thumb is an area easily touchable to the thumb of the user. In this way, initialization setting can be performed for the virtual soft keyboard according to the length of the thumb and use habit of different users and so on to obtain a virtual soft keyboard most suitable for the users to use.

In addition, to ensure normal use of the virtual soft keyboard, in the input method of the embodiment, a minimum radius of the virtual soft keyboard may be preset. After receiving the initialization instruction issued by the user for the virtual soft keyboard, the input method of the embodiment may further include:

according to the curve radius corresponding to the initialization instruction and the minimum radius needed by the virtual soft keyboard, determining the size of the sector area corresponding to the actual virtual soft keyboard, and calculating the size of each key according to the determined size of the sector area; and if the curve radius corresponding to the initialization instruction is smaller than the preset minimum radius, using the preset minimum radius as the radius of the sector area corresponding to the virtual soft keyboard.

Figure 17:
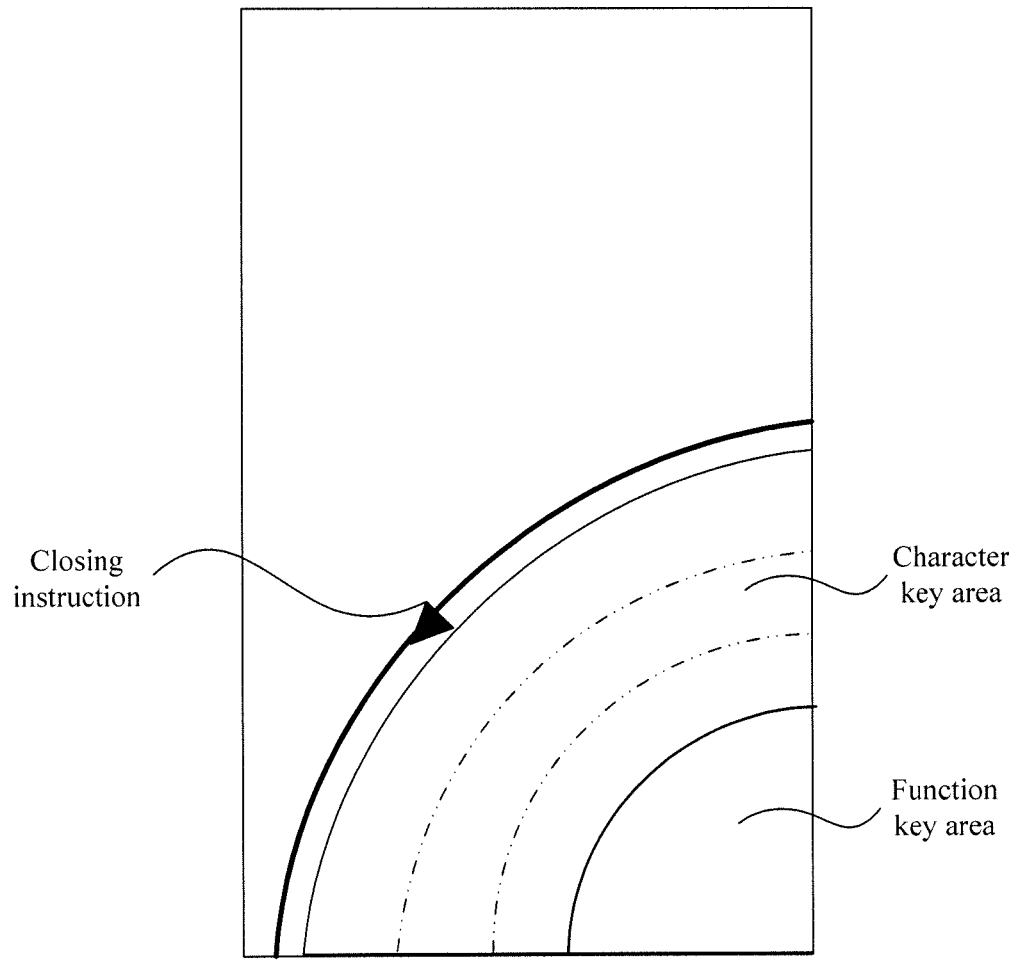
FIG. 17 is a schematic diagram of a closing instruction in an input method according to an embodiment of the present invention.

Further, when the input is complete or when the user intends to exit the input interface, the input method of the embodiment further includes:

receiving a closing instruction issued by the user, where the closing instruction indicates that a finger of the user slides along an outer arc boundary of the sector area of the virtual soft keyboard, as shown in FIG. 17, where the closing instruction indicates that a finger of the user slides counter-clockwise along an outer arc boundary of the sector area of the virtual soft keyboard; and closing the input interface according to the closing instruction.

In this way, the user may close the input interface easily, the implementation is easy, and the user experience is further enhanced.

It should be noted that the sliding operation used as a closing instruction in this embodiment is independent of the sliding operation used as an initialization instruction in the foregoing embodiment, and that the two operations have no impact on each other. With respect to the sliding directions, the two sliding operations may be both sliding in a clockwise direction or both sliding in a counterclockwise direction, or one of the sliding operations is sliding in a clockwise direction, and the other is sliding in a counterclockwise direction, and no limitation is set by the present invention.

Figure 18:
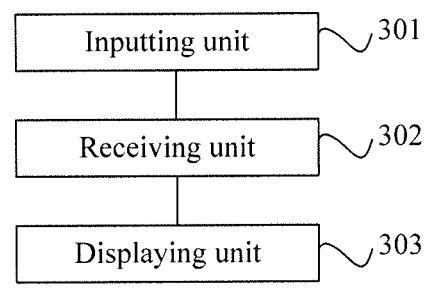
FIG. 18 is a schematic structural diagram of an input apparatus according to an embodiment of the present invention.

Correspondingly, an embodiment of the present invention provides an input apparatus, as shown in FIG. 18, including:

an inputting unit 301, configured to provide an input interface on a touch display screen, where the input interface includes a virtual soft keyboard distributed in a sector area around a lower left corner or lower right corner of the input interface;

a receiving unit 302, configured to receive an input instruction input by a user through the inputting unit 301; and a displaying unit 303, configured to display input information corresponding to the input instruction received by the receiving unit 302.

The input interface provided by the inputting unit 301 may include a display area for displaying final input information of the user.

In the input apparatus provided by the embodiment of the present invention, the virtual soft keyboard is distributed in the sector area around the lower left corner or lower right corner of the input interface. Therefore, the virtual soft keyboard may be centralized in an area covered by turning a finger by the user, which facilitates the tapping of the user. The user can perform an input with a single hand, without changing the hand gesture or using the other hand. In addition, the virtual soft keyboard is centralized in an area that can be easily tapped by the user, which can increase the input speed of the user, effectively reduce the fatigue of the finger, and apparently enhance the input experience of the user.

Specifically, in an embodiment of the present invention, the virtual soft keyboard provided by the inputting unit 301 includes one or more key bars in sector ring shapes distributed in sequence from outside to inside in the sector area, and the key bars are provided with keys in triangular or rectangular or irregular polygonal shapes. The shapes are not limited by the present invention, and preferably, the keys may be in triangular shapes.

Further, in an embodiment of the present invention, the virtual soft keyboard provided by the inputting unit 301 includes a term selection area, a character key area, and a function key area. The term selection area includes one or more key bars in sector ring shapes outermost in the sector area; the character key area includes one or more key bars in sector ring shapes in the middle of the sector area and is adjacent to the term selection area; and the function key area includes one or more key bars in sector ring shapes innermost in the sector area and is adjacent to the character key area.

Because the one or more key bars in sector ring shapes in the middle of the sector area are located in an area that is the most easily touchable to a finger of the user, and the one or more sector rings outermost in the sector area are located in an area that is more easily touchable to the finger of the user, the user can perform input operations in the character key area and term selection area with less fatigue of the finger as compared with the input operations in other areas. In the sector area, the innermost sector section adjacent to the character key area is close to the root of the input finger of the user and is an area that is the least easily touchable to the user, and the user's operations in this area should be avoided if possible. Therefore, the function key area is disposed in this area. In this way, only some less frequently used keys such as the menu key are disposed in this area, and the user experience is further enhanced.

Alternatively, the virtual soft keyboard provided by the inputting unit 301 may include only a term selection area and a character key area. The term selection area is distributed in an outmost sector ring in the sector area and includes one or more key bars in sector ring shapes. The character key area is distributed in an innermost sector section or sector ring in the sector area, includes one or more key bars in sector ring shapes, and is adjacent to the term selection area.

The receiving unit 302 is configured to receive an input instruction issued by the user. The user may issue an input instruction by touching or tapping any key on the virtual soft keyboard. The input instruction of the user is received by the receiving unit 302 and further processed.

When the user performs an input, according to different input content received by the receiving unit 302, the displaying unit 303 may directly display the input information corresponding to the input instruction of the user in the display area of the input interface (for example, when the user inputs English letters), or may firstly display candidate terms in the term selection area provided by the inputting unit 301 (for example, when Chinese characters are input) for the user to make a further selection, and the user may directly tap a corresponding candidate term to display the candidate term in the display area of the input interface.

Figure 19:
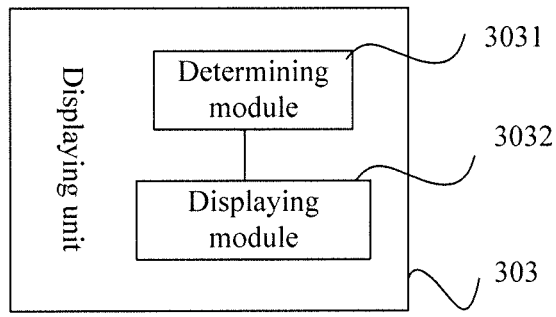
FIG. 19 is another schematic structural diagram of an input apparatus according to an embodiment of the present invention.

Further, as shown in FIG. 19, the displaying unit 303 may specifically include:

a determining module 3031, configured to determine candidate terms corresponding to the input instruction according to the input instruction; and a displaying module 3032, configured to display the candidate terms in sequence from the middle to two ends of the term selection area in descending order of use frequency of the candidate terms.

Alternatively, the displaying module 3032 may further display a most frequently used candidate term closest to the position of the last keystroke in the term selection area according to the position of the last keystroke corresponding to the input instruction.

In this way, after the displaying unit 303 displays the candidate terms in the term selection area, when the user makes a selection among the candidate terms, the user may easily select a term basically without moving the finger in a large range. Hence, the user feels more comfortable, and the user experience is further enhanced.

It should be noted that the candidate terms corresponding to the input instruction of the user, which are displayed in the term selection area by the displaying unit 303, include candidate single characters, or candidate associated terms, or a combination thereof. After the displaying unit 303 displays the candidate single characters or candidate associated terms in the term selection area, the user may directly tap a corresponding candidate single character or candidate associated term so that the candidate single character or candidate associated term is displayed in the display area of the input interface.

To further enhance the user experience, after the displaying unit 303 displays the input information corresponding to the input instruction in the term selection area, the receiving unit 302 is further configured to receive a term selection area display manner instruction issued by the user; and the displaying unit 303 is further configured to display, in the term selection area, only the candidate single characters or candidate associated terms corresponding to the input instruction according to the term selection area display manner instruction received by the receiving unit 302.

Specifically, the term selection area display manner instruction may indicate that the finger of the user presses a specified position in the term selection area and slides in one direction. For example, the user only needs to press the scroll bar of the term selection area with a thumb and slide, and the corresponding display mode will be displayed in the term selection area. For example, slide clockwise to display candidate associated terms, or slide counterclockwise to display candidate single characters. Details are already disclosed above, and not provided here.

In this way, the user may issue different term selection area display manner instructions to select a term selection area display manner desired by the user, and the user experience is further enhanced.

Further, in an embodiment of the present invention, the receiving unit 302 is further configured to receive an initialization instruction issued by the user for the virtual soft keyboard, where the initialization instruction indicates that the thumb of the user slides on the input interface, with the root of the thumb fixed in a position close to the lower left corner or lower right corner of the input interface provided by the inputting unit 301 and with the root of the thumb as a center.

Figure 20:
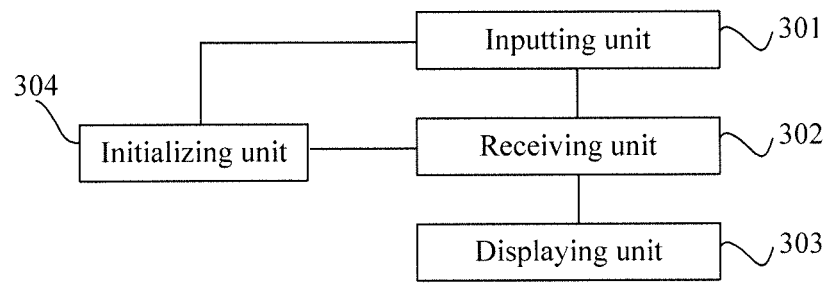
FIG. 20 is another schematic structural diagram of an input apparatus according to an embodiment of the present invention.

In this case, as shown in FIG. 20, the input apparatus of this embodiment further includes an initializing unit 304, configured to determine a distribution area of the virtual soft keyboard on the input interface according to the initialization instruction received by the receiving unit 302, where the distribution area is a sector area with a track corresponding to the initialization instruction as a boundary and the root of the thumb close to the lower left corner or lower right corner of the input interface as a vertex. According to the distribution area determined by the initializing unit 304, the inputting unit 301 provides the virtual soft keyboard located on the input interface.

Thereby, the input apparatus provided by the embodiment of the present invention is capable of performing initialization setting for the virtual soft keyboard according to the length of the finger and use habit of different users and so on to obtain a virtual soft keyboard most suitable for the users to use, thereby further enhancing the user experience.

In addition, in an embodiment of the present invention, the receiving unit 302 is further configured to receive a closing instruction issued by the user, where the closing instruction indicates that the finger of the user slides along an outer arc boundary of the sector area of the virtual soft keyboard.

Figure 21:
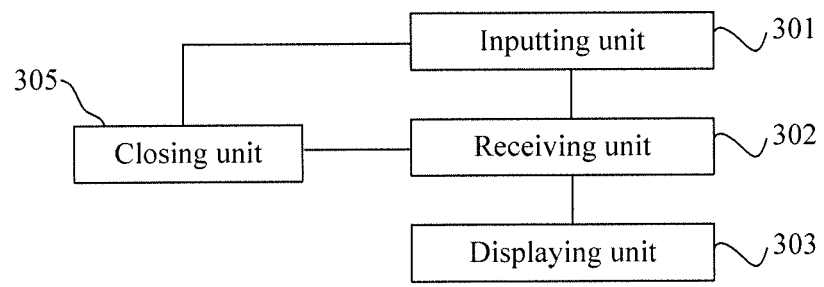
FIG. 21 is another schematic structural diagram of an input apparatus according to an embodiment of the present invention.

As shown in FIG. 21, the input apparatus further includes a closing unit 305, configured to close, according to the closing instruction received by the receiving unit 302, the input interface provided by the inputting unit 301.

This closing manner may avoid tapping of the user in an area outside the keyboard, facilitate single-hand operations, and help to further enhance the user experience.

Correspondingly, an embodiment of the present invention further provides a terminal device. The terminal device includes a touch display screen, a casing, and a circuit board, and further includes any one of the input apparatuses provided by the foregoing embodiments of the present invention. The touch display screen is disposed on the casing. The circuit board is disposed inside the casing. The processor is disposed on the circuit board (generally a printed circuit board). The input apparatus is disposed in the processor. The terminal device of the embodiment of the present invention uses the processor to process data input through the touch display screen and/or output the processed data through the touch display screen.

It should be noted that in the embodiment of the present invention, disposing the input apparatus in the processor means disposing all or a part of the units/modules of the input apparatus in the processor.

In the terminal device provided by the embodiment of the present invention, the virtual soft keyboard is distributed in the sector area around the lower left corner or lower right corner of the input interface. Therefore, the virtual soft keyboard may be centralized in an area covered by turning a finger by the user, which facilitates the tapping of the user. The user can perform an input with a single hand, without changing the hand gesture or using the other hand. In addition, the virtual soft keyboard is centralized in an area that may be easily tapped by the user, which can increase the input speed of the user, effectively reduce the fatigue of the finger, and apparently enhance the input experience of the user.

The terminal device may be a mobile phone, a man-machine interaction terminal, an e-book reader, or any other terminal device having a display function. When the terminal device is a mobile phone, the mobile phone includes:

a casing, a circuit board, a touch display screen, a processor, a radio frequency circuit, a microphone, a speaker, and a power supply, where: the touch display screen is disposed on the casing, the circuit board is disposed in a space enclosed by the casing, and the processor and the radio frequency circuit are disposed on the circuit board; the input apparatus is disposed in the processor.

the processor is configured to process data input through the touch display screen, and/or output the processed data result through the touch display screen;

the radio frequency circuit is configured to establish communication between the mobile phone and a wireless network, and implement data reception and transmission between the mobile phone and the wireless network;

the microphone is configured to collect a voice and convert the collected voice into voice data, so that the mobile phone sends the voice data to the wireless network through the radio frequency circuit;

the speaker is configured to restore voice data, which is received by the mobile phone from the wireless network through the radio frequency circuit, into a voice and play the voice to a user; and the power supply circuit is configured to supply power to each circuit or component of the mobile phone.

Persons of ordinary skill in the art should understand that all or a part of the processes of the methods in the embodiments may be implemented by a computer program instructing relevant hardware. The program may be stored in a computer readable storage medium. When the program is run, the steps of the methods in the embodiments are performed. The storage medium may be any medium capable of storing program codes, such as a ROM, a RAM, a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
   a touch display screen;
   a memory configured to store instructions; and
   a processor configured to execute the instructions to cause the apparatus to:
   display an input interface on the touch display screen, wherein the input interface includes a virtual soft keyboard displayed as a circular shape surrounding a corner of the input interface, wherein the virtual soft keyboard includes a character key area comprising at least one inner sector ring of the circular shape and a term selection area displayed in an outermost sector ring of the circular shape adjacent to the character key area;
   receive a plurality of user input operations through the character key area;
   determine a location of a most recent user input to the character key area;
   display a plurality of candidate terms in the term selection area in response to the determination, wherein the plurality of candidate terms are ranked based on a frequency of usage, wherein a most frequently used candidate term is displayed at a position in the term selection area closest to the location of the most recent user input, and wherein less frequently used terms are displayed sequentially on either side of the most frequently used candidate term;
   receive an input selection to the term selection area selecting a candidate term from among the plurality of candidate terms displayed in the term selection area; and
   display, in an area of the input interface, the candidate term selected according to the input selection received to the term selection area.

2. The apparatus of claim 1, wherein the virtual soft keyboard includes one or more key bars in sector ring shapes distributed in sequence in a direction from outside to inside of the virtual soft keyboard, and wherein the one or more key bars are provided with keys in triangular, rectangular, or irregular polygonal shapes.

3. The apparatus of claim 1, wherein the processor is further configured to execute the instructions to cause the apparatus to:
   receive a sliding operation along an outer arc boundary of the virtual soft keyboard; and
   remove the virtual soft keyboard from the touch display screen in response to the sliding operation received along the outer arc boundary of the virtual soft keyboard.

4. The apparatus of claim 1, wherein the virtual soft keyboard further includes a function key area displayed in another sector ring of the virtual soft keyboard and including one or more key bars in sector ring shapes, and wherein the function key area is displayed in an innermost sector ring of the virtual soft keyboard and is adjacent to the character key area.

5. The apparatus of claim 4, wherein the function key area includes at least one of a menu key, language selection key, or a punctuation key.

6. The apparatus of claim 1, wherein the character key area displays various characters to be used to input instructions by a user, and wherein the plurality of user input operations received through the virtual soft keyboard is received via the character key area.

7. A method, comprising:
   displaying an input interface on a touch display screen, wherein the input interface includes a first virtual soft keyboard displayed as a first circular shape surrounding a first corner of the input interface and a second virtual soft keyboard displayed as a second circular shape surrounding around a second corner of the input interface, wherein the first virtual soft keyboard includes a first character key area comprising at least one inner sector ring of the first circular shape and a first term selection area displayed in an outermost sector section of the first circular shape adjacent to the first character key area of the first virtual soft keyboard, and wherein the second virtual soft keyboard includes a second character key area comprising at least one inner sector ring of the second circular shape and a second term selection area displayed in an outermost sector section of the second circular shape adjacent to the second character key area of the second virtual soft keyboard;
   receiving a first plurality of user inputs through the first character key area and a second plurality of user inputs through the second character key area;
   determining a location of a most recent user input to the first character key area;
   displaying a plurality of candidate terms in the first term selection area in response to the determination, wherein the plurality of candidate terms is ranked based on a frequency of usage, wherein a most frequently used candidate term is displayed at position in the first term selection area closest to the location of the most recent user input, and wherein less frequently used terms are displayed sequentially on either side of the most frequently used candidate term;
   receiving an input selection to the first term selection area selecting a first candidate term from the plurality of candidate terms displayed in the first term selection area; and
   displaying, in an area of the input interface, the first candidate term selected according to the input selection received to the first term selection area.

8. The method of claim 7, wherein the first character key area is adjacent to the first term selection area and includes one or more key bars.

9. The method of claim 8, further comprising displaying a first function key area in an innermost sector section of the first virtual soft keyboard and adjacent to the first character key area, wherein the first function key area includes one or more key bars in sector ring shapes.

10. The method of claim 8, wherein the key bars of the first character key area are provided with keys in triangular, rectangular, or irregular polygonal shapes.

11. The method of claim 7, further comprising:
receiving a sliding operation along an outer arc boundary of the first virtual soft keyboard; and
removing the first virtual soft keyboard and the second virtual soft keyboard from the touch display screen in response to the sliding operation received along the outer arc boundary of the first virtual soft keyboard.

12. The method of claim 7, further comprising displaying a second function key area in an innermost sector section of the second virtual soft keyboard and adjacent to the second character key area, wherein the second function key area includes one or more key bars in sector ring shapes.

13. An apparatus, comprising:
a touch display screen;
a memory configured to store instructions; and
a processor configured to execute the instructions to cause the apparatus to:
display an input interface on the touch display screen, wherein the input interface includes a first virtual soft keyboard displayed as a first circular shape surrounding a first corner of the input interface and a second virtual soft keyboard displayed as a second circular shape surrounding a second corner of the input interface, wherein the first virtual soft keyboard includes a first character key area comprising at least one inner sector ring of the first circular shape and a first term selection area displayed in an outermost sector section of the first circular shape adjacent to the first character key area of the first virtual soft keyboard, and wherein the second virtual soft keyboard includes a second character key area comprising at least one inner sector ring of the second circular shape and a second term selection area displayed in an outermost sector section of the second circular shape adjacent to the second character key area of the second virtual soft keyboard;
receive a first plurality of user inputs through the first character key area and a second plurality of user inputs through the second character key area;
determine a location of a most recent user input to the first character key area;
display a plurality of candidate terms in the first term selection area in response to the determination, wherein the plurality of candidate terms are ranked based on a frequency of usage, wherein a most frequently used candidate term is displayed at position in the first term selection area closest to the location of the most recent user input, and wherein less frequently used terms are displayed sequentially on either side of the most frequently used candidate term;
receive an input selection to the first term selection area selecting a first candidate term from the plurality of candidate terms displayed in the first term selection area; and
display, in an area of the input interface, the first candidate term selected according to the input selection received to the first term selection area.

14. The apparatus of claim 13, wherein the processor is further configured to execute the instructions to cause the apparatus to:
receive a sliding operation along an outer arc boundary of the first virtual soft keyboard; and
remove the first virtual soft keyboard and the second virtual soft keyboard from the touch display screen in response to the sliding operation received along the outer arc boundary of the first virtual soft keyboard.

15. The apparatus of claim 13, wherein the first character key area is adjacent to the first term selection area displayed in the outermost sector section of the first virtual soft keyboard, and wherein the first character key area includes one or more key bars.

16. The apparatus of claim 13, wherein the first virtual soft keyboard further includes a first function key area displayed in an innermost sector section of the first virtual soft keyboard and adjacent to the first character key area, and wherein the first function key area includes one or more key bars in sector ring shapes.

17. The apparatus of claim 15, wherein the key bars of the first character key area are provided with keys in triangular, rectangular, or irregular polygonal shapes.

* * * * *

UNITED STATES PATENT AND TRADEMARK OFFICE
CERTIFICATE OF CORRECTION

PATENT NO. : 10,795,574 B2
APPLICATION NO. : 16/410438
DATED : October 6, 2020
INVENTOR(S) : Yun Yang Page 1 of 1

It is certified that error appears in the above-identified patent and that said Letters Patent is hereby corrected as shown below:

In the Claims

Claim 7, Column 14, Line 26: "surrounding around a second" should read "surrounding a second"

Signed and Sealed this
Seventeenth Day of November, 2020

Andrei Iancu
*Director of the United States Patent and Trademark Office*